United States Patent Office 3,277,051
Patented Oct. 4, 1966

3,277,051
PREPARATION OF POLYHYDROXYETHERS
John Wynstra, Bridgewater Township, N.J., assignor to Union Carbide Corporation, a corporation of New York
No Drawing. Filed Sept. 21, 1961, Ser. No. 139,602
10 Claims. (Cl. 260—47)

This invention relates to preparation of polyhydroxyethers of high molecular weight by a simplified method providing shortened reaction times. More particularly, the invention relates to preparation of polyhydroxyethers in a simplified reaction medium.

Various methods have been reported in the literature for the preparation of resins of reacting a dihydric polynuclear phenol with an epihalohydrin. For example, 2,2-bis-(p-hydroxyphenyl)-propane has been reacted with epichlorohydrin, in an alkaline medium, to produce a resin whose structure has been represented by the formula:

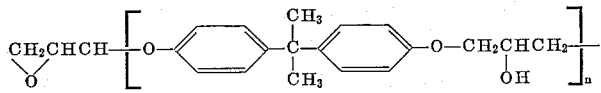

wherein $n$ is an integer having a value of 0 to about 20.

In the series of commercially available resins whose structure is represented by the formula noted in the preceding paragraph, the highest molecular weight resin is one wherein $n$, as stated, has a value of about 20. These resins, however, suffer the deficiency of being brittle and friable and of not possessing adequate toughness for use in typical plastics applications unless reacted with other materials and converted to a thermoset state. Consequently, such resins have found practically no utility in molding applications and in the formation of thin self-sustaining film material.

Somewhat higher molecular weight resins prepared by reacting a dihydric polynuclear phenol with epichlorohydrin have apparently been disclosed by Carpenter et al. in U.S.P. 2,602,075, issued July 1, 1952. These resins, although somewhat higher in molecular weight than commercially available, thermosetting brittle resins referred to by formula in the preceding paragraph, are still characterized by undesirable properties such as low extensibility, low reduced viscosity and lack of toughness, as indicated by low impact strength.

To successfully prepare high molecular weight polyhydroxyethers it is essential to have reaction solution of a convenient viscosity for agitation, both initially and after the polymer has begun to form. There has not been known, up to now, a single solvent which would dissolve both the reactants and the polymer produced and which would be alkali resistant and water miscible as well.

It is an object of this invention to provide such a solvent.

It is another object to provide method for preparing polyhydroxyethers utilizing a simple reaction medium.

It is another object to provide method for preparing polyhydroxyethers wherein higher reaction temperatures can be employed to give shorter reaction times to a polyhydroxyethers of high molecular weight.

It has now been discovered that these objects are achieved through the use of dimethyl sulfoxide as the reaction medium in the preparation of polyhydroxyethers by the condensation reaction of substantially equimolar amounts of a dihydric polynuclear phenol and an epihalohydrin in the presence of a stoichiometric excess of an alkali metal hydroxide.

The polyhdroxyethers prepared by the method of this invention have reduced viscosities of at least 0.45 to about 1 and preferably from about 0.5 to about 0.7; a melt index at 220° C. and 44 p.s.i. of less than about 5 decigrams per minute and preferably from about 0.1 to about 4 decigrams per minute.

Surprisingly, condensations effected with a dimethyl sulfoxide reaction medium produce high molecular weight polyhydroxyethers over a wide range of temperatures and reaction times. Unlike polyhydroxyether reaction media heretofore known, dimethyl sulfoxide can be used alone as the medium in which the reaction of the dihydric poly-

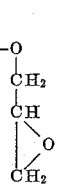

nuclear phenol and the epihalohydrin in the presence of an aqueous solution of an alkil metal hydroxide is initiated. Since dimethyl sulfoxide is a solvent for the polymer, the reaction solution is readily maintained at an agitatable viscosity. Also, unlike polyhydroxyether reaction media heretofore known, high molecular weight polymers of wide utility are obtained with either short reaction times at high temperatures, e.g., ten minutes at 130° C. or longer reaction times at lower temperatures, e.g., eight hours at 70° C.

Dimethyl sulfoxide is a colorless, nearly odorless liquid and has the formula

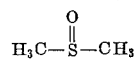

This compound is completely miscible with water and numerous organic solvents such as acetone, benzene, chloroform, ether, ethanol and tert-butyl alcohol. The physical properties of the commercially available dimethyl sulfoxide include:

| | |
|---|---|
| Boiling point (760 mm. Hg) ° C__ | 189 |
| Specific gravity (20° C.) | 1.1014 |
| Viscosity (25° C.) centipoises__ | 1.98 |
| Heat of vaporization (189° C.) calories/gram__ | 132 |
| Flash point (open cup) ° C__ | 95 |
| Dielectric constant | 45 |

The products of the present method, polyhydroxyethers, are substantially linear, gel-free thermoplastic condensation reaction products of a dihydric polynuclear phenol and an epihalohydrin and contain as the recurring units a residue of a dihydric polynuclear phenol having the general formula —O—E—O— wherein E is the nucleus of the dihydric polynuclear phenol in which the hydroxyl groups are attached to different nuclei, and a group having the general formula

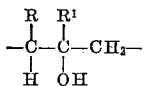

wherein R and R¹ which can be the same or different are hydrogen or methyl with the recurring units having the general formula

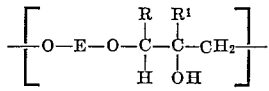

E, R and R¹ being as previously defined.

Illustrative of dihydric polynuclear phenols which can be reacted with epihalohydrins to produce the thermoplastic polyhydroxyethers of the present invention are the dihydric polynuclear phenols having the general formula:

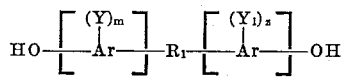

wherein: Ar is an aromatic divalent hydrocarbon radical such as naphthylene and phenylene with phenylene being preferred for purposes of this invention; Y and $Y_1$, which can be the same or different are alkyl radicals such as methyl, n-propyl, n-butyl, n-hexyl, n-octyl and the like, preferably alkyl radicals having a maximum of 4 carbon atoms; or halogen atoms, i.e., chlorine, bromine, iodine, or fluorine; or alkoxy radicals such as methoxy, methoxymethyl, ethoxy, ethoxyethyl, n-butoxy, amyloxy and the like, preferably an alkoxy radical having a maximum of 4 carbon atoms. It is to be understood that whenever there are substituents exclusive of the hydroxyl groups on either or both of the aromatic divalent hydrocarbon groups, these substituents can be the same or different; m and z are integers having a value from 0 to a maximum value corresponding to the number of hydrogen atoms on the aromatic ring (Ar) which can be replaced by substituents and can have the same or different values; and $R_1$ is a divalent radical, for example

or —O—, or —S—, or —SO—, or —SO$_2$—, or —S—S—, or a divalent hydrocarbon radical as for example an alkylene radical such as methylene, ethylene, trimethylene, tetramethylene, pentamethylene, 2-ethyl hexamethylene, octamethylene, nonomethylene, decamethylene, and the like; an alkylidene radical such as ethylidene, propylidene, isopropylidene, isobutylidene, amylidene, isoamylidene, 1-phenyl ethylidene and the like, or a cycloaliphatic radical, such as 1,4 - cyclohexylene, 1,3 - cyclohexylene, cyclohexylidene, and the like, or halogenated alkylidene, alkylene, or cycloaliphatic radicals, alkoxy and aryloxy substituted alkylidene, alkylene or cycloaliphatic radicals, such as methoxy methylene, ethoxy methylene, ethoxy ethylene, 2 - ethoxy trimethylene, 3 - ethoxy pentamethylene, 1,4 - (2 - methoxycyclohexane), phenoxy ethylene, 2 - phenoxy trimethylene, 1,3 - (2 - phenoxy cyclohexane), and the like, aralkylene radicals, such as phenyl ethylene, 2 - phenyl trimethylene, 1 - phenyl pentamethylene, 2 - phenyl decamethylene, and the like, aromatic radicals, such as phenylene, naphthylene, and the like, halogenated aromatic radicals, such as 1,4 - (2-chlorophenylene), 1,4 - (2 - bromophenylene), 1,4 - (2-fluorophenylene), and the like; alkoxy and aryloxy substituted aromatic radicals, such as 1,4 - (2 - methoxyphenylene), 1,4 - (2 - ethoxyphenylene), 1,4 - (2 - n-propoxyphenylene), 1,4 - (2 - phenoxyphenylene), and the like, alkyl substituted aromatic radicals, such as 1,4-(2 - methylphenylene), 1,4 - (2 - ethylphenylene), 1,4- (2 - n - propylphenylene), 1,4 - (2 - n - butylphenylene), 1,4 - (2 - n - dodecylphenylene) and the like; or $R_1$ can be a ring which is fused to one of the Ar groups as is the case, for example, in the compound having the formula:

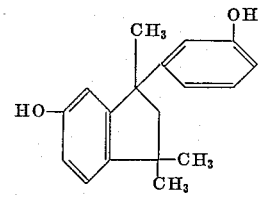

or $R_1$ can be a polyalkoxy radical such as polyethoxy, polypropoxy, polythioethoxy, polybutoxy, polyphenylethoxy; or $R_1$ can be a radical containing a silicon atom as, for example, polydimethylsiloxy, polydiphenylsiloxy, polymethylphenylsiloxy and the like; or $R_1$ can be two or more alkylene or alkylidene radicals separated by an aromatic ring, a tertiary amino group, an ether linkage, a carbonyl group or separated by a linkage containing sulfur such as sulfur, sulfoxide and the like.

Particularly preferred are the dihydric polynuclear phenols having the general formula:

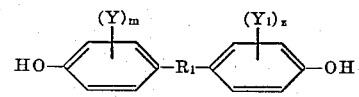

wherein Y, $Y_1$, are as previously defined, m and z have values of from 0 to 4 inclusive and $R_1$ is an alkylene or alkylidene group, preferably having from 1 to 3 carbon atoms inclusive or $R_1$ is a saturated group having the formula:

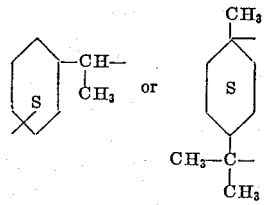

Polyhydroxyethers produced using the dihydric polynuclear phenols described in the preceding paragraph have extremely good mechanical properties. In addition, polyhydroxyethers produced using a dihydric polynuclear phenol wherein $R_1$ is a saturated group having the formula:

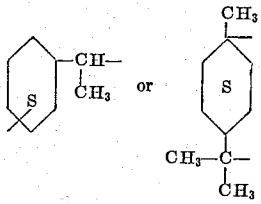

have heat distortion temperatures which are relatively high.

Examples of other specific dihydric phenols include among others the bis-(hydroxyphenyl)-alkanes such as 2,2-bis(p-hydroxyphenyl)-propane, commonly referred to as bisphenol-A,2,4'-dihydroxy diphenylmethane,
bis-(2-hydroxyphenyl)-methane,
bis-(4-hydroxyphenyl)-methane,
bis-(4-hydroxy-2,6-dimethyl-3-methoxyphenyl)-methane,
1,1-bis-(4-hydroxyphenyl)-ethane,
1,2-bis-(4-hydroxyphenyl)-ethane,
1,1-bis-(4-hydroxy-2-chlorophenyl)-ethane,
1,1-bis-(3,5-dimethyl-4-hydroxyphenyl)-ethane,
1,3-bis(3-methyl-4-hydroxyphenyl)-propane,
2,2-bis-(3-phenyl-4-hydroxyphenyl)-propane,
2,2-bis(3-isopropyl-4-hydroxyphenyl)-propane, 2,2-bis-(2-isopropyl-4-hydroxyphenyl)-propane,
2,2-bis-(4-hydroxynaphthyl)-propane,
2,2-bis-(4-hydroxyphenyl)-pentane,
3,3-bis-(4-hydroxyphenyl)-pentane,
2,2-bis-(4-hydroxyphenyl)-heptane,
bis-(4-hydroxyphenyl)-phenylmethane,
bis-(4-hydroxyphenyl)-cyclohexylmethane,
1,2-bis-(4-hydroxyphenyl)-1,2-bis-(phenyl)-propane,
2,2-bis-(4-hydroxyphenyl)-1-phenylpropane and the like;

dihydroxybiphenyls such as
4,4'-dihydroxybiphenyl,
2,2'-dihydroxybiphenyl,
2,4'-dihydroxybiphenyl and the like;

di(hydroxyphenyl)sulfones such as
bis-(4-hydroxyphenyl)-sulfone,
2,4'-dihydroxydiphenyl sulfone,
5'-chloro-2,4'-dihydroxydiphenyl sulfone,
5'-chloro-4,4'-dihydroxyphenyl sulfone,
3'-chloro-4,4'-dihydroxy diphenyl sulfone and the like;

di(hydroxyphenyl) ethers such as
bis-(4-hydroxyphenyl)-ether,
the 4,3'-, 4,2'-, 2,2'-, 2,3'-dihydroxy-diphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxybiphenyl)-ether,
4,4'-dihydroxy-2,6-dimethoxy-diphenyl ether,
4,4'-dihydroxy-2,5-diethoxydiphenyl ether, and the like;

also suitable are
1,1-bis-(4-hydroxyphenyl)-1-phenylethane,
1-(4-hydroxyphenyl)-1-[4(4-hydroxyphenyl)-cyclohexyl]ethane,
1,3,3-trimethyl-1-(4-hydroxyphenyl)-6-hydroxyindane,
2,4-bis-(p-hydroxyphenyl)-4-methylpentane and the like.

Mixtures of dihydric polynuclear phenols can also be employed and wherever the term "dihydric polynuclear phenol" is used herein, mixtures of these compounds are intended to be included.

For purposes of this invention, the dihydric polynuclear phenols which are used are substantially free of higher functional phenolic compounds, that is, phenols containing three or more phenolic hydroxyl groups, such as trihydric phenols or trisphenols. In general, the dihydric polynuclear phenols used should contain less than about 1.5 mole percent and preferably less than about 0.5 mole percent, based on the moles of dihydric polynuclear phenols, of such higher functional phenols. A dihydric polynuclear phenol, containing more than about 1.5 mole percent of higher functional phenolic compounds, when reacted with an epihalohydrin according to the present invention, tends to form a gel.

The concentration of the higher functional phenolic compounds in the dihydric polynuclear phenols can be readily measured by conventional chromatographic techniques such as described by W. M. Anderson, G. B. Carter and A. J. Landua in Analytical Chemistry 31, 1214 (1959), and if necessary, the dihydric polynuclear phenol can be purified by recrystallization from a suitable solvent such as toluene.

More than about 1.5 mole percent of a higher functional phenolic compound can be tolerated in the dihydric polynuclear phenols provided that an equivalent amount of a monohydric phenol is added in order to offset the increased functionality of the resultant system.

If desired, monohydric phenols can be added to the reaction mixture containing the dihydric polynuclear phenol and the epihalohydrin at the start of the reaction or at any other convenient time during the course of the reaction.

The monohydric phenols serve to regulate the molecular weight of the polyhydroxyether by acting as a chain terminator. When used as chain terminator, the monohydric phenols are used in amounts of from about 0.01 mole to about 0.05 mole, preferably about 0.01 mole to about 0.02 mole per mole of the dihydric polynuclear phenol. This amount is in addition to the amount of monohydric phenol used for purposes of offsetting the presence of higher functional phenolic compounds as explained in the preceding paragraph. Illustrative of suitable monohydric phenols are the following: phenol, alkylated monohydric phenols such as m-cresol, ethyl phenol, p-tertiary butylphenol and the like; alkoxy monohydric phenols such as m-methoxyphenol, m-ethoxyphenol and the like; halogenated monohydric phenols such as m-chlorophenol, m-bromophenol and the like, and p-phenyl phenol and the like.

Among suitable epihalohydrins and mixtures thereof which can be reacted with dihydric polynuclear phenols to produce the thermoplastic polyhydroxyethers of this invention are those having the general formula:

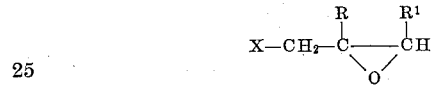

wherein R and R¹ which can be the same or different are hydrogen or methyl and X is a halogen atom, i.e, chlorine, bromine, and the like. Specific epihalohydrins are epichlorohydrin, epibromohydrin, 1,2-epoxy-1-methyl-3-chloropropane and 1,2-epoxy-2-methyl-3-chloropropane.

The proportions of reactants necessary to produce polyhydroxyethers of useful molecular weights by the method of this invention are narrowly critical. Specifically the molar ratio of epihalohydrin and dihydric polynuclear phenol should be substantially equimolar, that is, from 0.985 mole to 1.015 moles of the epihalohydrin per mole of dihydric polynuclear phenol. In addition it is essential to have present in the reaction mixture a stoichiometric excess of an alkali metal hydroxide e.g., sodium hydroxide or potassium hydroxide over the moles of epihalohydrin present. The excess of alkali metal hydroxide can range from 0.01 to 0.5 mole per mole of epihalohydrin, with an excess of 0.02 mole per mole of epihalohydrin being preferred.

The effects of variations in the amount of excess of alkali hydroxide and/or the molar ratios of the reactants are illustrated in the examples. Results of several of the examples are summarized below in Table I. The phenol in each example is 2,2-bis(4-hydroxyphenyl)propane.

TABLE I

| Ex. No. | Molar Charge Ratio | | | Excess NaOH | Temp. (° C.) | Time (hrs.) | Reduced Viscosity |
|---|---|---|---|---|---|---|---|
| | Phenol | Epichlorohydrin | NaOH | | | | |
| 9 | 1.000 | 1.000 | 1.020 | 0.020 | 130 | 1 | 0.40 |
| 4 | 1.000 | 1.000 | 1.038 | 0.038 | 135 | 1 | 0.50 |
| 10 | 1.000 | 1.000 | 1.050 | 0.050 | 132 | 1 | 0.55 |
| 11 | 1.000 | 1.006 | 1.026 | 0.020 | 132 | 1 | 0.48 |
| 12 | 1.000 | 1.010 | 1.030 | 0.020 | 130 | 1 | 0.55 |
| 13 | 1.010 | 1.000 | 1.050 | ¹ 0.030 | 132 | 1 | 0.46 |
| 14 | 1.000 | 1.000 | 1.010 | 0.010 | ² 70–120 | 3.5 | 0.42 |
| 15 | 1.000 | 1.000 | 1.020 | 0.020 | ² 70–120 | 3.5 | 0.48 |
| 16 | 1.000 | 1.000 | 1.030 | 0.030 | ² 70–130 | 4 | 0.61 |

¹ This is excess base present as NaOH; in addition 0.020 equivalent of Na+ phenoxide salt is present.
² Temperature raised in 10° C. increments.

In general, it is preferred to employ a 1:1 molar ratio of dihydric polynuclear phenol to epihalohydrin and one mole of alkali metal hydroxide. An excess over stoichiometric of epihalohydrin tends to cause a higher degree of branching in the polyhydroxyether which can result in gelation; hence a slight decrease in alkali metal hydroxide concentration is desirable. An excess over stoichiometric of the phenol reactant may cause some chain termination; hence, a slight increase in alkali metal hydroxide concentration is desirable.

It will be noted from a consideration of Table I that at constant molar ratios of 2,2-bis(4-hydroxyphenyl)propane to epichlorohydrin, a slight increase in the excess of sodium hydroxide results in higher molecular weight polymers (Examples 9, 4 and 10). Also, a slight excess of epichlorohydrin over 2,2-bis(4-hydroxyphenyl)propane provides polyhydroxyethers of highly desirable molecular weights (Examples 11 and 12). Similarly, a slight excess of 2,2-bis(4-hydroxyphenyl)propane over epichlorohydrin provides polyhydroxyethers of good molecular weight (Example 13). In similarly conducted reactions, but with reduced viscosity above 0.45 are obtained with extremely short reaction times, e.g., 10 minutes. It is preferred for maximum molecular weight polyhydroxyether, however, to effect the reaction initially at a low temperature and then increase the reaction temperature stepwise by, for example, 10° C. increments up to the maximum temperature. Examples 5, 6, 7, and 8 summarized in Table II illustrate how greater molecular weight is achieved by longer reaction times at lower temperatures.

The reaction medium in Table II is described as being dimethyl sulfoxide/$H_2O$. Of necessity, water is present in the reaction vessel because the polymerization reaction produces water as a by-product. This can be seen from a typical reaction of 2,2-bis(4-hydroxyphenyl)-propane and epichlorohydrin:

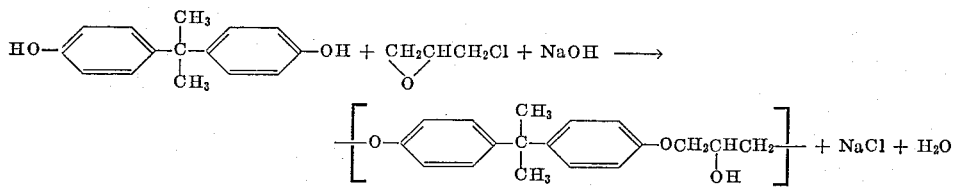

stepwise heating, a progressive increase in the amount of excess sodium hydroxide caused a comparable increase in molecular weight of the polyhydroxyether obtained.

To prepare the polyhydroxyether the polynuclear dihydric phenol and the epihalohydrin, or the polynuclear dihydric phenol alone is dissolved in dimethyl sulfoxide. Thereafter the alkali metal hydroxide is added preferably as an aqueous solution, e.g., a 10 to 50 percent aqueous solution, preferably a 25 percent aqueous solution and, if the epihalohydrin has not yet been added, it is added at this point. Reaction begins immediately upon the mutual presence of the dihydric polynuclear phenol, the epihalohydrin and the alkali metal hydroxide. The reaction to polyhydroxyethers using dimethyl sulfoxide as a reaction solvent characteristically involves the formation of a two-phase system. The lower and greater phase contains the formed polymer in dimethyl sulfoxide; the upper phase contains the salt by-product of the reaction in aqueous solution. Polymerization is effected with great rapidity in this reaction medium as evidenced by an appreciable thickening of the lower phase shortly after reaction is initiated. The reaction is continued until the lower phase has the desired viscosity. The upper phase is then drawn off and discarded. The lower phase is then worked up, for example by quenching, as by the addition of dioxane. The polyhydroxyether is isolated by coagulation in water, filtering and dehydration.

The temperature at which the reaction is conducted is not critical. This is shown by Table II following.

TABLE II.—EFFECT OF TEMPERATURE ON THE 2,2-BIS(4-HYDROXYPHENYL)PROPANE/EPICHLOROHYDRIN/NaOH (1.000:1.000:1.038) REACTION IN DIMETHYL SULFOXIDE/$H_2O$ REACTION MEDIUM

| Example No. | Temp., ° C. | Actual Time | Probable Time [1] | Reduced Viscosity |
|---|---|---|---|---|
| 4 | 130 | 1 hr | <10 min | 0.50 |
| 5 | 130 | 10 min | | 0.56 |
| 6 | 100 | 1.5 hrs | 1 hr | 0.52 |
| 7 | 70 | 8 hrs | 8 hrs | 0.55 |
| 8 | 70 | 20 hrs | | 0.68 |

[1] "Probable time" is the time from the start of the reaction at which viscosity appeared to reach a maximum and beyond which, apparently, little further reaction took place.

It is evident from a consideration of Table II that a wide range of temperatures and reaction times produce polyhydroxyether of highly desirable molecular weight. Reaction temperatures, for example, up to about 130° C. (reflux) and as low as about 70° C. can be conveniently employed with some adjustment respectively in brevity or length of reaction. It is a significant feature of this invention that high molecular weight polymers, e.g., of a Also water is introduced as a practical matter during the addition of alkali metal hydroxide because aqueous solutions of these hydroxides are the most feasible means of addition. It has been found that the absence of water in the reaction vessel has a deleterious effect on the dimethyl sulfoxide as a reaction medium. Anhydrous dimethyl sulfoxide is not an effective reaction medium. In general, there should be at least one part by weight of water per ten parts by weight of dimethyl sulfoxide in the reaction solution. In practice a large portion of this water will be in the upper phase. While it is not known with exactness how much water is in the lower, polymer-bearing phase of the reaction, it has been found that if the above minimum amount of water is present in the reaction vessel sufficient water remains in the lower phase to enable the dimethyl sulfoxide to be an effective reaction solvent. The water in the reaction vessel has the added function of solubilizing the salt by-product, and thereby preventing its precipitation. It is preferred to have a concentration of water in dimethyl sulfoxide of about 10 percent or greater to prevent precipitation of by-product salt. This leads to a lighter colored polyhydroxyether product. There is no intrinsic upper limit on the amount of water which can be tolerated in the reaction zone, and only convenience of handling the reaction solution will militate against additional water. More than 70 percent by weight, however, will not ordinarily have any advantage. The effect of water concentration in a typical polyhydroxyether preparation using dimethyl sulfoxide is shown in Table III following.

III.—EFFECT OF WATER ON THE 2,2-BIS(4-HYDROXYPHENYL)PROPANE/EPICHLOROHYDRIN/NaOH (1.000:1.000:1.040) CONDENSATION IN DIMETHYL SULFOXIDE

| Example No. | Weight Percent $H_2O$ in DMSO [1]/ $H_2O$ Mixture | DMSO [1]/ $H_2O$ Ratio [2] | Temp., ° C. | Time, hrs. | Reduced Viscosity |
|---|---|---|---|---|---|
| 4 | 12.3 | 122/15 | 130 | 1 | 0.50 |
| 17 | 24.6 | 122/30 | 125 | 1 | 0.54 |
| 18 | 42.6 | 122/52 | 119 | 2 | 0.54 |
| 19 | 52 | 100/52 | 118 | 2 | 0.51 |
| 20 | 66.2 | 245/162 | 113 | 3 | 0.44 |

[1] Dimethyl sulfoxide.
[2] Expressed per 100 parts of product expected. At less than a 100/100 parts ratio of DMSO to expected product, agitation is undesirably inefficient. A greater than 245/100 parts ratio of DMSO to expected product is ordinarily not advantageous since the excess appears to migrate to the aqueous brine phase and not aid in maintaining the polymer bearing phase at a lower viscosity.

It is within the scope of the present invention to employ another organic solvent with the dimethyl sulfoxide. The effect of the presence of other solvents in the reaction medium is illustrated in Table IV following.

TABLE IV.—EFFECT OF OTHER ORGANIC SOLVENTS ON THE EQUI MOLAR 2,2-BIS(4-HYDROXYPHENYL)PROPANE/EPICHLOROHYDRIN REACTION IN EXCESS NaOH

| Example No. | Other Solvent | Weight Percent H₂O/Solvent/DMSO [1] | Moles NaOH | Temp., °C. | Time, hrs. | Reduced Viscosity |
|---|---|---|---|---|---|---|
| 21 | Dioxane | 11/44.5/44.5 | 1.088 | 104 | 2.5 | 0.51 |
| 22 | Tertbutyl alcohol. | 11.1/22.4/66.5 | 1.038 | 103 | 2.5 | 0.48 |

[1] Dimethyl sulfoxide.

As illustrated by the examples in Table IV, cyclic ethers such as dioxane and lower alkyl alcohols such as tert-butyl alcohol can be employed in up to equal weight amounts with dimethyl sulfoxide in the reaction medium. Other liquid inert organic solvents which are miscible with dimethyl sulfoxide can also be used. Among such solvents are ketones such as acetone, aromatics such as benzene, other ethers and alcohols such as diethyl ether and ethanol and halogenated hydrocarbons, particularly halogenated alkanes such as chloroform.

Once a poly(hydroxyether) is produced which has a reduced viscosity of at least about 0.45, it is customary to insure that the poly(hydroxyether) is free of epoxy groups, i.e.,

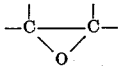

by adding to an organic solution of the poly(hydroxyether) a small amount of a monofunctional compound which will destroy epoxy groups and heating the mixture for about 1 to 2 hours at reflux. Illustrative of such compounds are monohydric phenols such as previously noted in this specification, e.g., p-phenylphenol, as well as such monohydric phenols as o-hydroxybiphenyl, o-cyclohexylphenol, p-cyclohexylphenol and the like; mineral acid catalysts for hydrolysis of epoxy groups such as hydrochloric acid, phosphoric acid and the like; monocarboxylic acids such as those having the formula $R^4COOH$ wherein $R^4$ is a saturated hydrocarbon group, preferably containing from 1 to 4 carbon atoms such as acetic acid, propionic acid, butyric acid and the like; aromatic acids such as benzoic acid and the like; secondary amines such as dimethylamine, diethyl amine, di-n-propylamine, diethanolamine, and the like; mercaptans such as those having the general formula $R^5SH$ wherein $R^5$ is a saturated hydrocarbon group, preferably containing 1 to 4 carbon atoms inclusive such as ethyl mercaptan and the like.

As a rule heating an organic solution of the polyhydroxyether in contact with from about 0.1 mole to about 0.5 mole of a monofunctional compound, per mole of dihydric polynuclear phenol forming part of the initial reaction mixture, is sufficient to insure that all epoxy groups have been destroyed. More than about 0.5 mole of the monofunctional compound per mole of the dihydric polynuclear phenol can be used if so desired.

Recovery of the poly(hydroxyether) from the dimethyl sulfoxide reaction medium can be accomplished by a variety of convenient methods. For example, the upper brine phase can be removed by decantation from the lower polymer containing phase. The poly(hydroxyether) can then be isolated by coagulation from the dimethyl sulfoxide with cold water suitably slightly acidified as with HCl, H₃PO₄, or acetic acid. The polymer is then water washed in order to insure that any residual alkali metal hydroxide and alkali metal hydroxide salt is removed. The thermoplastic poly(hydroxyether) can then be dried by the use of a heated two-roll mill or a vacuum oven.

The condensation reaction is conducted, generally, under atmospheric pressure although, if desired, the reaction can be conducted under sub-atmospheric or super-atmospheric pressure. Also, the condensation reaction can be conducted under the atmosphere of an inert gas such as nitrogen.

The following examples are illustrative and not intended to limit the scope of this invention in any manner.

All the dihydric polynuclear phenols employed in the examples of this specification were substantially pure as determined by chromatographic analysis.

Tests referred to in this application and not described in detail have the following designations.

| Tests: | Designation |
|---|---|
| Tensile strength (film) | ASTM D882-54T |
| Tensile modulus (film) | ASTM D882-54T |
| Tensile elongation (film) | ASTM D882-54T |

The poly(hydroxyethers) of the present invention, as shown have excellent mechanical properties making such materials desirable for use in a wide variety of applications. For example, their excellent thermal stability, allows them to be extruded or otherwise shaped by thermoforming techniques into a multitude of objects such as film, rods, tubing and the like without degradation or without advancing to an unworkable state. The excellent tensile impact strength of the poly(hydroxyethers) provides articles produced therefrom with excellent resistivity to impact, bending and other such rough usage.

If desired, film produced from the poly(hydroxyethers) can be biaxially stretched at appropriate temperatures, to effect an orientation of the molecules thereof thus further improving its mechanical properties, as is well known in the art.

In addition to the production of film material and molded articles, the poly(hydroxyethers) can be used as coatings on such material as aluminum foil, polyethylene, magnetic tapes and the like as well as used to form laminated structures.

The practice of the present invention is illustrated by the following examples. All parts and percentages are by weight unless otherwise stated.

Example 1

A 5-liter three-necked flask equipped with a dropping funnel, reflux condenser, thermometer, stirrer and electronically controlled heating mantle was used.

To the flask at room temperature was added:

| | G. |
|---|---|
| 2,2-bis(4-hydroxyphenyl)propane (3.00 moles) | 684 |
| Epichlorohydrin (99.5% pure) (3.00 moles) | 279 |
| Dimethyl sulfoxide | 1040 |

To the dropping funnel was added:

| | G. |
|---|---|
| Sodium hydroxide (98.8% assay) (3.06 moles) | 123.8 |
| Deionized water | 439 |

To initiate the reaction three-fourths (422.1 g.) of the NaOH solution was run into the flask. An exotherm to 68° C. in 50 minutes was noted. The remaining NaOH solution was added in two approximately equal portions at 50 and 60 minutes after initiation of the reaction. A peak exotherm of 72° C. was recorded 1.5 hours after the start of the reaction. Heat was then applied to the flask contents by means of the heating mantle in 10° C. increments each 30 minutes until the flask contents refluxed at 120° C.

Soon after the start of the reaction the clear solution in the flask became turbid and separated into two distinct phases. The lower and major phase became progressively more viscous. The upper and minor phase at no time had an appreciable viscosity. The two phase reaction mass was held at reflux (120° C.) for an hour.

The polymer was isolated by decanting off the non-viscous upper phase. This phase which contained much of the excess alkali and by-product salt of the reaction was discarded. The viscous, lower, polymer-containing phase was diluted by the addition of 2 liters of dioxane and then coagulated in cold water slightly acidified with HCl in a Waring Blendor. The coagulated polymer was then filtered. The fibrous precipitate obtained was washed with water twice and dehydrated by milling on a steam-heated two-roll mill (200° C.).

The polymer had the following properties:

| | |
|---|---:|
| Reduced viscosity (deciliters per gram) | 0.46 |
| Melt flow (A) at 220° C. and 44 p.s.i. | 4.24 |
| Melt flow (B) at 220° C. and 220 p.s.i. | 32.6 |
| Flow ratio (B/A) (220 p.s.i./44 p.s.i.) | 7.7 |
| Tensile strength p.s.i. | 9,200 |
| Tensile modulus p.s.i. | 314,000 |
| Elongation at break percent | 150 |

*Thermal stability.*—After being heated at 250° C. for 20 minutes:

| | |
|---|---:|
| Reduced viscosity (deciliters per gram) | 0.47 |
| Melt flow at 220° C. and 44 p.s.i. | 3.41 |

Example 2

The procedure of Example 1 was followed except that just prior to the reaction solution reaching reflux temperature (120° C.) additional sodium hydroxide solution, (9.7 g. NaOH in 20 g. of water) was added to the reaction flask. The reflux was continued for an hour and the polymer separated and dried as in Example 1.

The polymer had the following properties:

| | |
|---|---:|
| Reduced viscosity (deciliters per gram) | 0.51 |
| Melt flow (A) at 220° C. and 44 p.s.i. | 2.62 |
| Melt flow (B) at 220° and 220 p.s.i. | 32.6 |
| Flow ratio (B/A) | 9.0 |
| Tensile strength p.s.i. | 8,700 |
| Tensile modulus p.s.i. | 316,000 |
| Elongation at break percent | 148 |

*Thermal stability.*—After being heated at 250° C. for 20 minutes:

| | |
|---|---:|
| Reduced viscosity (deciliters per gram) | 0.51 |
| Melt flow at 220° C. and 44 p.s.i. | 2.22 |

Example 3

A 2 liter three-necked flask equipped with analytical burette, reflux condenser, thermometer, stirrer and electronically controlled heating mantle was used.

To the flask there was added.

| | G. |
|---|---:|
| 2,2-bis(4-hydroxyphenyl)propane (1.000 mole) | 228 |
| Epichlorohydrin (99.5% pure) (1.000 mole) | 93.1 |
| Dimethyl sulfoxide | 347 |

This formed a clear solution, the temperature of which was 32° C.

To the burette there was added an 18.60 N sodium hydroxide solution.

The alkali solution was prepared in advance from C.P. grade NaOH pellets in an equal weight of water. The alkali solution, after cooling to room temperature, was standardized against normal HCl using phenolphathalein as an indicator.

There was run into the flask from the burette over a 10 minute period 56.5 milliliters of the sodium hydroxide solution. The temperature of the contents of the flask rose to 63° C. at the end of the 10 minutes. Heat was applied by the heating mantle so that after another 5 minutes the batch was at reflux temperature (129–132° C.); the reflux was continued for 1 hour. The viscosity of the batch increased rapidly especially during the first 10 minutes of refluxing and a distinct separation into two phases took place. One phase was a major highly viscous polymer solution and the other a minor, colored, rather fluid, brine phase.

The polymer was recovered, isolated and dried as in Example 1.

The polymer had the following properties:

| | |
|---|---:|
| Reduced viscosity (deciliters per gram) | 0.49 |
| Melt flow (A) at 220° C. and 44 p.s.i. | 1.75 |
| Melt flow (B) at 220° C. and 220 p.s.i. | 17.8 |
| Flow ratio (B/A) | 10.2 |
| Tensile strength p.s.i. | 8,140 |
| Tensile modulus p.s.i. | 323,000 |
| Elongation at break percent | 120 |

*Thermal stability.*—After being heated at 250° C. for 20 minutes:

| | |
|---|---:|
| Reduced viscosity (deciliters per gram) | 0.49 |
| Melt flow at 220° C. and 44 p.s.i. | 1.72 |

Example 4

A 1 liter three-necked flask equipped with reflux condenser, thermometer, stirrer and heating mantle was used.

To the flask there was first added:

| | G. |
|---|---:|
| 2,2-bis(4-hydroxyphenyl)propane (0.500 mole) | 114 |
| Epichlorohydrin (99.5% pure) (0.500 mole) | 46.6 |
| Dimethyl sulfoxide | 173.5 |

Then there was added to the flask a premixed solution of

| | G. |
|---|---:|
| Sodium hydroxide (98.9% assay) (0.519 mole) | 21.0 |
| Distilled water | 21 |

An exothermic reaction began immediately. Additional heat was supplied to the flask in order to reach refluxing temperature rapidly. At 70° C. the solution turned from clear to turbid, indicating the formation and precipitation of sodium chloride, a reaction by-product. The reflux temperature, 132° C., was reached only four minutes after the addition of the sodium hydroxide solution which initiated the reaction. After only four minutes of refluxing two distinct phases formed. The lower much larger layer was a very viscous polymer/dimethyl sulfoxide phase; the upper, quite minor, very fluid layer was probably an aqueous brine phase containing some dimethyl sulfoxide. After a total of eight minutes at reflux temperature there was little evidence of further reaction. Refluxing was continued for a total of 60 minutes. Then the reaction was stopped by cooling and thinning the batch by addition of 250 ml. of dioxane.

The polymer from the lower phase was coagulated and acidified with HCl in a Waring Blendor and washed several times with water. The fibrous powder obtained was dried overnight in an 80° C. vacuum oven. Reduced viscosity of the polymer was 0.50.

Example 5

The procedure of Example 4 was followed but using a 2 liter flask and charging thereto:

| | G. |
|---|---:|
| 2,2-bis(4-hydroxyphenyl)propane (1.000 mole) | 228 |
| Epichlorohydrin (99.5% pure) (1.000 mole) | 93.1 |
| Dimethyl sulfoxide | 347 | and then adding a premixed solution of

| | G. |
|---|---:|
| Sodium hydroxide (98.9% assay)—(1.050 mole) | 42.5 |
| Water | 42 |

The batch was brought to reflux as in Example 4 but kept at reflux for only 10 minutes instead of 60. After working up as in Example 4, a polymer was obtained which had a reduced viscosity of 0.56 deciliter per gram.

Example 6

The procedure of Example 4 was followed except that the temperature of the reaction solution was kept below 100° C. at all times. After an hour polymerization had progressed so far that agitation was barely possible. After an additional 30 minutes the reaction was stopped with dioxane and the polymer worked up as in Example 4. Reduced viscosity of the polymer was 0.52 deciliter per gram.

Example 7

The procedure of Example 4 was followed except that the temperature of the reaction solution was kept below 70° C. at all times. The viscosity of the solution increased steadily over an eight hour period. After eight hours the reaction was stopped by diluting with dioxane and the polymer worked up as in Example 4. Reduced viscosity of the polymer was 0.55 deciliter per gram.

Example 8

Example 7 was repeated except that heating to 70° C. and stirring was continued for twenty hours instead of eight. Reduced viscosity of the polymer was 0.68 deciliter per gram.

Example 9

A 1 liter three-necked flask equipped with analytical burette, reflux condenser, thermometer, stirrer and heating mantle was used.

To the flask there was added:

|  | G. |
|---|---|
| 2,2-bis(4-hydroxyphenyl)propane _____(0.500 mole)__ | 114 |
| Epichlorohydrin (99.5% pure)___(0.500 mole)__ | 46.6 |
| Dimethyl sulfoxide _____ | 173.5 |

From the burette there was added 28.4 ml. of 17.97 N NaOH solution (0.510 mole) prepared and standardized in the manner of Example 3.

The contents of the burette were run into the reaction flask. An exothermic reaction began immediately. Additional heat was supplied to the flask in order to reach refluxing temperature rapidly. At 70° C. the solution turned from clear to turbid. The reflux temperature (132° C.) was reached only four minutes after the addition of the sodium hydroxide solution. After only four additional minutes of refluxing two distinct phases formed. The lower, much larger layer was a very viscous polymer/dimethyl sulfoxide phase; the upper, quite minor, very fluid layer was probably an aqueous brine phase containing some dimethyl sulfoxide. After a total of eight minutes at reflux temperature there was little evidence of further reaction. Refluxing was continued for a total of sixty minutes. Then the reaction was stopped by cooling and thinning the batch by addition of 250 ml. of dioxane.

The polymer from the lower phase was coagulated and acidified with HCl in a Waring Blendor and washed several times with water. The fibrous powder obtained was dried overnight in an 80° C. vacuum oven. Reduced viscosity of the polymer was 0.40 deciliter per gram.

Example 10

The procedure of Example 9 was followed except that the number of moles of the NaOH were increased to 0.525 by the use of 29.2 ml. of the 17.97 N NaOH solution. Reduced viscosity of the polymer was 0.55 deciliter per gram.

Example 11

The procedure of Example 9 was followed placing in the reaction flask

|  | G. |
|---|---|
| 2,2-bis(4-hydroxyphenyl)propane _____(0.500 mole)__ | 114 |
| Epichlorohydrin (99.5% pure)____(0.503 mole) | 46.8 |
| Dimethyl sulfoxide _____ | 173.5 | and adding thereto 27.60 ml. of 18.60 N NaOH solution (0.513 mole).

Reduced viscosity of the polymer was 0.48 deciliter per gram.

Example 12

The procedure of Example 9 was followed placing in the flask

|  | G. |
|---|---|
| 2,2-bis(4-hydroxyphenyl)propane _____(0.500 mole)__ | 114 |
| Epichlorohydrin (99.5% pure)___(0.505 mole)__ | 47 |
| Dimethyl sulfoxide _____ | 173.5 | and adding thereto 27.7 ml. of 18.60 N NaOH solution (0.515 mole).

Reduced viscosity of the polymer was 0.55 deciliter per gram.

Example 13

The procedure of Example 9 was followed placing in the flask.

|  | G. |
|---|---|
| 2,2-bis(4-hydroxyphenyl)propane _____(0.505 mole)__ | 115.1 |
| Epichlorohydrin (99.5% pure)___(0.500 mole)__ | 46.6 |
| Dimethyl sulfoxide _____ | 173.5 | and adding thereto 28.2 ml. of 18.60 N NaOH solution (0.525 mole).

Reduced viscosity of the polymer was 0.46 deciliter per gram.

Example 14

A 1 liter three-necked flask equipped with analytical burette, reflux condenser, thermometer, stirrer and heating mantle was used.

To the flask there was added

|  | G. |
|---|---|
| 2,2-bis(4-hydroxyphenyl)propane (0.500 mole)__ | 114 |
| Epichlorohydrin (99.5% pure) ___(0.500 mole)__ | 46.6 |
| Dimethyl sulfoxide _____ | 173.5 |

From the burette there was added 27.3 ml. of 18.49 N NaOH solution (0.505 mole) and 53.5 g. distilled water. The exotherm was sufficient to carry the temperature of the reactants to 70° C. in 20 minutes. Heat was then applied stepwise according to the following schedule:

| | |
|---|---|
| Up to 30 minutes after start of the reaction, temperature was _____ | 70° C. |
| After 30 up to 60 minutes after start of the reaction, temperature was _____ | 80° C. |
| After 60 up to 90 minutes after start of the reaction, temperature was _____ | 90° C. |
| After 90 up to 120 minutes after start of the reaction, temperature was _____ | 100° C. |
| After 120 up to 150 minutes after start of the reaction, temperature was _____ | 110° C. |
| After 150 up to 210 minutes after start of the reaction, temperature was _____ | 120° C. (reflux) |

The viscosity of the lower polymer-bearing phase increased constantly in viscosity during the course of the above incremental temperature increases, indicating a smooth polymerization reaction. The polymer was coagulated and dried as in Example 1 and sheeted and diced while hot. Reduced viscosity of the polymer was 0.42 deciliter per gram.

Example 15

The procedure of Example 14 was followed but with increased excess of NaOH. There was placed in the flask

|  | G. |
|---|---|
| 2,2-bis(4-hydroxyphenyl)propane (0.500 mole) | 114 |
| Epichlorohydrin (99.5% pure) ___(0.500 mole) | 46.6 |
| Dimethyl sulfoxide | 173.5 |

From the burette there was added 27.6 ml. of 18.49 N NaOH solution (0.510 mole). Fifty-three and five-tenths grams distilled water were added. The polymer had a reduced viscosity of 0.48 deciliter per gram.

Example 16

The procedure of Example 15 was followed but with a further increased excess of NaOH. Also, the final temperature achieved was 130° C., the normal refluxing temperature of the system.

There was placed in the flask

|  | G. |
|---|---|
| 2,2-bis(4-hydroxyphenyl)propane (0.500 mole) | 114 |
| Epichlorohydrin (99.5% pure) ___(0.500 mole) | 46.6 |
| Dimethyl sulfoxide | 173.5 |

There was added to the flask a solution of 20 g. NaOH (98.9% assay) in 20 g. distilled water (0.515 mole). Reduced viscosity of the polymer was 0.61 deciliter per gram.

Example 17

The procedure of Example 4 was followed placing in the flask:

|  | G. |
|---|---|
| 2,2-bis(4-hydroxyphenyl)propane (0.500 mole) | 114 |
| Epichlorohydrin (99.5% pure) ___(0.500 mole) | 46.6 |
| Dimethyl sulfoxide | 173.5 |
| Water | 22 |

Then there was added to the flask a premixed solution of

|  | G. |
|---|---|
| Sodium hydroxide (98.9% assay) | 21.0 |
| Water | 21.0 |

The reaction proceeded as did the reaction in Example 4 except that the reactants refluxed at 125° C. The refluxing was continued for an hour, after which the polymer was isolated by the procedure of Example 4. Reduced viscosity of the polymer was 0.54 deciliter per gram.

Example 18

The procedure of Example 4 was followed, placing in the flask

|  | G. |
|---|---|
| 2,2-bis(4-hydroxyphenyl)propane (0.500 mole) | 114 |
| Epichlorohydrin (99.5% pure) ___(0.500 mole) | 46.6 |
| Dimethyl sulfoxide | 173.5 |
| Water | 53.5 |

There was added to the flask 28.1 ml. of 18.47 N NaOH solution (0.520 mole). Reaction proceeded as in Example 4. The reaction temperature was brought rapidly to reflux temperature (119° C.) and maintained there for 2 hours. The polymer was coagulated and washed as in Example 4 and then dehydrated by milling on a 2 roll mill at 260° C. Reduced viscosity of the polymer was 0.54 deciliter per gram.

Example 19

The procedure of Example 18 was followed, except that less dimethyl sulfoxide was used, by placing in the flask:

|  | G. |
|---|---|
| 2,2-bis(4-hydroxyphenyl)propane (0.500 mole) | 114 |
| Epichlorohydrin (99.5% pure) ___(0.500 mole) | 46.6 |
| Dimethyl sulfoxide | 148 |
| Water | 53.5 |

There was added to the flask 28.1 ml. of 18.47 N NaOH solution (0.520 mole).

Reduced viscosity of the polymer was 0.51 deciliter per gram.

Example 20

The procedure of Example 18 was followed, except that both the amount of water and the amount of dimethyl sulfoxide were increased, by placing in the flask:

|  | G. |
|---|---|
| 2,2-bis(4-hydroxyphenyl)propane __(0.500 mole) | 114 |
| Epichlorohydrin (99.5% pure) ____(0.500 mole) | 46.6 |
| Dimethyl sulfoxide | 347 |
| Water | 210 |

There was added to the flask 28.1 ml. of 18.47 N NaOH solution (0.520 mole). Reaction was carried out at reflux (113° C.) for 3 hours.

Reduced viscosity of the polymer was 0.44 deciliter per gram.

Example 21

The procedure of Example 4 was followed except that a 1:1 mixture by weight of dimethyl sulfoxide and dioxane was employed as the reaction solvent, by placing in the reaction flask.

|  | G. |
|---|---|
| 2,2-bis(4-hydroxyphenyl)propane __(0.500 mole) | 114 |
| Epichlorohydrin (99.5% pure)_____(0.500 mole) | 46.6 |
| Dimethyl sulfoxide | 86.8 |
| Dioxane | 86.8 |

There was added to the flask a premixed solution of 22 g. of NaOH (98.9% NaOH) (0.544 mole) in 22 g. of water.

The reaction solution was quickly brought to reflux (104° C.) and maintained there for 2.5 hours. Reduced viscosity of the polymer was 0.51 deciliter per gram.

Example 22

The procedure of Example 4 was followed except that a 75:25 mixture of dimethyl sulfoxide and tert-butyl alcohol was employed as the reaction solvent, by placing in the reaction flask.

|  | G. |
|---|---|
| 2,2-bis(4-hydroxyphenyl)propane __(0.500 mole) | 114 |
| Epichlorohydrin (99.5% pure)_____(0.500 mole) | 46.6 |
| Dimethyl sulfoxide | 130.1 |
| Tert-butyl alcohol | 43.4 |

There was added to the flask a premixed solution of 21 g. of NaOH (98.9% NaOH) in 21 g. of water.

Reduced viscosity of the polymer was 0.48 deciliters per gram.

Example 23

A 1 liter three-necked flask equipped with analytical burette, reflux condenser, thermometer, stirrer and heating mantle was used.

To the flask there was added

|  | G. |
|---|---|
| 2,2-bis(4-hydroxyphenyl)propane __(0.500 mole) | 114 |
| Dimethyl sulfoxide | 173.5 |

Then there was run into flask from the burette 28.1 ml. of 18.49 NaOH solution (0.520 mole).

Then there was added to the flask 46.6 g. of epichlorohydrin (99.5% pure) and the reaction mixture was heated to reflux temperature (130° C.). The mixture was refluxed for 1 hour. The polymer was coagulated, washed and dried as in Example 14.

Reduced viscosity of the polymer was 0.62 deciliter per gram.

Example 24

A 500 milliliter three-decked flask equipped with analytical burette, reflux condenser, thermometer, stirrer and heating mantle was used.

To the flask there was added

| | G. |
|---|---|
| 2,2 - bis(3,5 - dichloro - 4 - hydroxyphenyl)propane (recrystallized from toluene) ___(0.250 mole)__ | 91.5 |
| Epichlorohydrin (99.5% pure) ___(0.250 mole)__ | 23.3 |
| Dimethyl sulfoxide _____ | 117.5 |

There was then run into the flask from the burette 14.1 milliliters of an 18.60 N NaOH solution (0.262 mole). The reaction proceeded as a 2,21bis(4-hydroxyphenyl)propane reaction in formation of two phases, but the increase in lower phase viscosity was appreciably slower. The polymer obtained had a reduced viscosity at least as high as that obtained with slower processes heretofore known.

Example 25

A 1 liter three-necked flask equipped with analytical burette, reflux condenser, thermometer, stirrer and heating mantle is used.

There is added to the flask

| | G. |
|---|---|
| 1 - (4 - hydroxyphenyl) - 1 - [4(4 - hydroxyphenyl)-cyclohexyl]ethane _____(0.333 mole)__ | 98.8 |
| Epichlorohydrin (99.5% pure) ____(0.333 mole)__ | 31.1 |
| Dimethyl sulfoxide _____ | 160 |

There is then run into the flask from the burette 19.13 milliliters (0.351 mole) of 18.26 N NaOH solution. Water, 35 g., is added. There quickly develops a very viscous lower polymer bearing phase. The polymer is isolated and worked up as in Example 4.

The bisphenol, 1 - (4 - hydroxyphenyl) - 1 - [4(4-hydroxyphenyl)-cyclohexyl]ethane is produced by the condensation under acidic conditions of vinyl cyclohexene and phenol.

Example 26

A 1 liter three-necked flask equipped with analytical burette, reflux condenser, thermometer, stirrer and heating mantle is used.

There is added to the flask

| | G. |
|---|---|
| 1,1-bis-(4-hydroxyphenyl)-1-phenylethane _____(1.0 mole)__ | 308.3 |
| Epichlorohydrin (99.5% pure) _____(1.0 mole)__ | 93.1 |
| Dimethyl sulfoxide _____ | 249 |

There is then run into the flask from the burette 56.9 milliliters of 18.47 N NaOH solution (1.05 moles). The resulting polymer is isolated and worked up as in Example 4.

Example 27

A 1 liter three-necked flask equipped with analytical burette, reflux condenser, thermometer, stirrer and heating mantle is used.

There is added to the flask

| | G. |
|---|---|
| Dihydroxy diphenyl sulfone _____(1.0 mole)__ | 252.2 |
| Epichlorohydrin (99.5% pure) ____(1.0 mole)__ | 93.1 |
| Dimethyl sulfoxide _____ | 249 |

There is then run into the flask from the burette 56.9 milliliters of 18.47 N NaOH solution (1.05 moles). The resulting polymer is isolated and worked up as in Example 4.

Reduced viscosity throughout the present specification was determined by weighing a 0.2 gram sample of polyhydroxyether into a 100 ml. volumetric flask and adding tetrahydrofuran thereto. After solution was complete, additional tetrahydrofuran was added to exactly the 100 ml. mark while the flask was maintained in a 25° C. constant temperature bath. The solution was thereafter filtered through a sintered glass funnel and the viscosity of a 3 ml. sample determined in an Ostwalt viscometer at 25° C. Reduced viscosity values were computed by use of the equation:

$$RV = \frac{t_s - t_o}{ct_o}$$

wherein:
$t_o$ is the efflux time for the solvent,
$t_s$ is the efflux time for the polyhydroxyether solution,
$c$ is the concentration of the polyhydroxyether solution in terms of grams of polyhydroxyether per 100 ml. of solution.

Melt index (MI) was determined by weighing in grams the amount of polyhydroxyether, which was at a temperature of 220° C. and under a pressure of 44 p.s.i., that flowed through an orifice having a diameter of 0.825 inch and a length of 0.315 inch over a 10 minute period. Four such determinations were made and the average value of the 4 determinations was reported as decigrams per minute under a pressure of 44 p.s.i. at 220° C.

What is claimed is:
1. Method for the preparation of thermoplastic polyhydroxyethers which comprises
   (a) mixing together in a reaction medium comprising dimethyl sulfoxide (1) a dihydric polynuclear phenol having the general formula

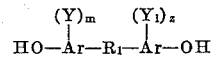

wherein Ar is an aromatic divalent hydrocarbon radical, each of Y and $Y_1$, is a monovalent radical selected from the group consisting of alkyl, alkoxy and halogen radicals, each of $m$ and $z$ are integers having a value of 0 to a maximum value corresponding to the number of replaceable hydrogen atoms on Ar and $R_1$ is a divalent radical selected from the group consisting of

—O—, —S—, —SO—, —SO$_2$—, —S—S— and a divalent hydrocarbon radical, (2) from 0.985 to 1.015 moles of an epihalohydrin per mole of said phenol, and (3) an excess over stoichiometric proportions of an alkali metal hydroxide in aqueous solution to form a reaction mixture containing sufficient dimethyl sulfoxide to dissolve said dihydric polynuclear phenol and thermoplastic polyhydroxyether product and at least one part by weight water per ten parts of dimethyl sulfoxide,
   (b) heating the reaction mixture until a two-phase system is formed, continuing heating thereafter until a polyhydroxyether with recurring units having the general formula

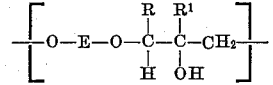

wherein E is the nucleus of said dihydric polynuclear phenol and each of R and $R^1$ is a radical selected from the group consisting of hydrogen or methyl and a reduced viscosity of at least 0.45 measured at 25° C. as a 0.2 gram sample in 100 milliliters of tetrahydrofuran is obtained, and
   (c) recovering said polyhydroxyether.

2. Method claimed in claim 1 wherein the alkali metal hydroxide aqueous solution is a 10 to 50 percent by weight aqueous solution.

3. Method claimed in claim 1 wherein the reaction medium comprises dimethyl sulfoxide containing from 10 to 70 percent by weight water based on the dimethyl sulfoxide.

4. Method claimed in claim 1 wherein the molar ratio of epihalohydrin to phenol is 1 to 1.

5. Method claimed in claim 1 wherein the reaction medium comprises dimethyl sulfoxide, up to an equal part by weight of a liquid inert organic solvent miscible with the dimethyl sulfoxide and from 10 to 70 percent by weight water.

6. Method claimed in claim 1 wherein the epihalohydrin is epichlorohydrin.

7. Method claimed in claim 6 wherein the excess of alkali metal hydroxide is 0.01 to 0.5 mole per mole of epichlorohydrin.

8. Method claimed in claim 1 wherein the reaction mixture is heated at a temperature of from 70° C. to the refluxing temperature of the system.

9. Method claimed in claim 1 wherein the dimethyl sulfoxide, polynuclear dihydric phenol and alkali metal hydroxide are first mixed together and the epihalohydrin is added.

10. Method claimed in claim 1 wherein the polynuclear dihydric phenol is 2,2-bis(4-hydroxyphenyl)propane.

References Cited by the Examiner

UNITED STATES PATENTS

| | | | |
|---|---|---|---|
| 2,602,075 | 7/1952 | Carpenter et al. | 260—47 |
| 3,177,090 | 4/1965 | Bayes et al. | 260—2 |

WILLIAM H. SHORT, *Primary Examiner.*

HAROLD N. BURSTEIN, *Examiner.*

T. D. KERWIN, P. H. HELLER, *Assistant Examiners.*